(12) United States Patent
Labbe et al.

(10) Patent No.: US 11,746,720 B2
(45) Date of Patent: Sep. 5, 2023

(54) METHOD, COMPUTING UNIT, AND COMPUTER PROGRAM FOR OPERATING AN INTERNAL COMBUSTION ENGINE

(71) Applicant: Robert Bosch GmbH, Stuttgart (DE)

(72) Inventors: Magnus Labbe, Moeglingen (DE); Bernd Kraewer, Winnenden (DE); Thomas Kuhn, Heilbronn (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/825,890

(22) Filed: May 26, 2022

(65) Prior Publication Data
US 2022/0381194 A1  Dec. 1, 2022

(30) Foreign Application Priority Data
May 31, 2021 (DE) ...................... 10 2021 205 508.7

(51) Int. Cl.
*F02D 41/14* (2006.01)
*F02D 41/00* (2006.01)
*F02D 29/06* (2006.01)
*F02D 41/02* (2006.01)

(52) U.S. Cl.
CPC ......... *F02D 41/1475* (2013.01); *F02D 29/06* (2013.01); *F02D 41/0002* (2013.01); *F02D 41/029* (2013.01); *F02D 2200/025* (2013.01); *F02D 2200/0802* (2013.01)

(58) Field of Classification Search
CPC ............. F02D 41/1475; F02D 41/0002; F02D 41/029; F02D 29/06; F02D 2200/0802; F02D 2200/025; F02D 2250/18; F02D 2250/24; F02D 41/025; F02D 41/40; Y02T 10/12
See application file for complete search history.

(56) References Cited

FOREIGN PATENT DOCUMENTS

| DE | 19953480 A1 | 5/2001 |
|---|---|---|
| DE | 10110500 A1 | 10/2002 |
| DE | 102004019831 A1 | 11/2005 |
| DE | 102012021882 A1 | 5/2014 |
| DE | 102013200621 A1 | 7/2014 |
| DE | 102014208215 B3 | 7/2015 |
| DE | 102016120432 A1 | 4/2018 |
| DE | 102016222418 A1 | 5/2018 |
| DE | 102019207506 A1 | 11/2020 |
| ES | 2216796 | * 11/2004 |

* cited by examiner

*Primary Examiner* — Carl C Staubach
*Assistant Examiner* — Diem T Tran
(74) *Attorney, Agent, or Firm* — Michael Best & Friedrich LLP

(57) ABSTRACT

A method (100) is proposed for operating an internal combustion engine (210), which comprises a lean-burn engine having compression-ignition, having a throttle valve (213) in an air path (212) upstream of the internal combustion engine (210) and an exhaust gas posttreatment system (202) downstream of the internal combustion engine (210), comprising a control of the internal combustion engine (210) according to a present load demand (130) using metering of an amount of fuel in dependence on the present load demand; and if a load demand (130) is absent in a heating operating mode, further comprising partially closing (140) the throttle valve (213) and defining a minimum value for the amount of fuel, which is greater than zero. Furthermore, a computing unit and a computer program for carrying out such a method (100) are proposed.

8 Claims, 2 Drawing Sheets

METHOD, COMPUTING UNIT, AND COMPUTER PROGRAM FOR OPERATING AN INTERNAL COMBUSTION ENGINE

BACKGROUND OF THE INVENTION

The present invention relates to a method for operating an internal combustion engine as well as a computing unit and a computer program for carrying out the method.

Exhaust gas posttreatment based on a three-way catalytic converter (TWC) is prior art for the exhaust gas posttreatment of stoichiometrically operated internal combustion engines, in particular gasoline engines. Nitrogen oxides ($NO_x$), non-combusted hydrocarbons (HC), and carbon monoxide (CO) can thus be converted simultaneously and oxidized to form carbon dioxide ($CO_2$) and water ($H_2O$) or reduced to form nitrogen ($N_2$), respectively.

In contrast, diesel engines are very predominantly operated using a lean mixture. For engines using lean combustion, systems having $NO_x$ storage catalytic converters (NSC) are known, for the regeneration of which a periodic rich operation is necessary. To achieve heating of the exhaust gas system, for example, to prepare for an NSC regeneration or NSC desulfurization or for the regeneration of a particle filter, so-called throttling, thus partially closing a throttle valve in the intake manifold, can be used.

SUMMARY OF THE INVENTION

According to the invention, a method for operating an internal combustion engine as well as a computing unit and a computer program for carrying out the method having the features of the independent claims are proposed. Advantageous embodiments are the subject matter of the dependent claims and the following description.

In summary, the invention enables efficient heating operation to be implemented with the least possible pollutant emission even in a lean-burn engine. This can take place in all operating conditions, which require the exhaust system to be heated or kept warm in a vehicle having internal combustion engine and possibly further drives. One exemplary application is the heating of the exhaust system after a cold start.

In the event of low or absent torque demand on the lean-burn engine, the injection quantity is in particular not completely reduced in the heating operating mode, but rather the throttle valve is closed as much as possible and the amount of fuel resulting in the desired exhaust gas composition is injected. A heating process is thus implemented by means of fired overrun in the lean-burn engine by this combustion operation in the event of low or absent torque demand. In a normal operating mode (thus when no heat introduction into the exhaust gas posttreatment system is necessary), a conventional overrun cut-off is carried out to reduce the fuel consumption.

A use is preferred to ensure operation of the internal combustion engine at a lambda value of the exhaust gas of one after a cold start or a stop-start. It is particularly important here to avoid a delay of the heating in order to reduce cold start emissions. A fired overrun prevents the cooling of the exhaust system in the absence of a torque demand by the driver.

In detail, a method according to the invention for operating an internal combustion engine, which comprises a lean-burn engine (for example, diesel engine or hydrogen engine, possibly with compression-ignition), having a throttle valve in an air path upstream of the internal combustion engine and an exhaust gas posttreatment system downstream of the internal combustion engine, comprises controlling the internal combustion engine according to a present load demand with metering of an amount of fuel in dependence on the present load demand; and furthermore, in a heating operating mode, partially closing the throttle valve and defining a minimum value for the amount of fuel, which is greater than zero (even in the absence of a load demand). With this use of the fired overrun in the heating operating mode, the cooling of the exhaust gas posttreatment system is minimized by the overrun. An undesired introduction of oxygen also does not take place. The minimum value can in particular be defined in dependence on a temperature of the exhaust gas posttreatment system and/or in dependence on a function of the exhaust gas posttreatment system.

The method advantageously comprises controlling the internal combustion engine in the heating operating mode to produce exhaust gas having an air-fuel ratio less than or equal to 1. The fuel consumption can thus be minimized without negative influence on the heating performance, by which an optimum exhaust gas posttreatment can be ensured.

The mentioned function of the exhaust gas posttreatment system can comprise a regeneration of a particle filter and/or a reduction of exhaust gas components stored in a storage catalytic converter, in particular nitrogen oxides. These are particularly relevant functions, for which a minimum temperature of the exhaust gas posttreatment system is required and which are negatively influenced or prevented by oxygen.

The partial closing of the throttle valve takes place in particular in dependence on a minimum required amount of air, wherein the method in particular comprises ascertaining the minimum required amount of air in dependence on a stability of the combustion of fuel in the internal combustion engine and/or an acoustic threshold value and/or a vibration threshold value and/or a parameter influencing a controllability of the internal combustion engine. The stability of the combustion can thus be ensured by metered fuel and further parameters can be taken into consideration, which relate in particular to driving comfort and safety.

In the heating operating mode, the method advantageously comprises absorbing provided torque by way of an electrical machine and using the absorbed torque to generate electric energy. Possible excess torque can thus be supplied to a reasonable use, which increases the overall efficiency of the machine, on the one hand, but prevents the internal combustion engine from revving up, on the other hand, as the firing according to the invention in the heating operating mode will often generate a torque which is greater than the typical friction losses. The latter applies in particular in a disengaged state, thus when the internal combustion engine is mechanically separated from driven machine parts (for example, transmission, wheels), while in an engaged state, the friction losses are naturally higher, so that the excess torque is less overall and therefore contributes less strongly to accelerating the internal combustion engine. Typically, no torque is generated by the internal combustion engine in overrun phases, so that in these phases electrical machines are not used for generating current in normal operation, but rather are switched off so as not to exert a deceleration torque on the drivetrain. The invention is thus also applicable in operating phases in which the generated torque is significantly greater than the mentioned friction losses.

The electrical machine can be used here in a normal operating mode in particular to provide torque according to the load demand and/or to generate electrical energy for use in a power grid. In particular, such electrical machines are provided in any case in vehicles (e.g., dynamo, starter generator, electric drive of a hybrid vehicle, or the like), so that no additional hardware components are necessary to carry out such a method. In particular in hybrid vehicles, the lesser decrease of the overall drive torque due to the fired overrun in comparison to a conventional overrun shut-off can be compensated for by deliberate torque distribution between the drives, for example, the mentioned power consumption of an electrical machine.

A computing unit according to the invention, for example, a control unit of a motor vehicle, is configured, in particular by programming, to carry out the method according to the invention.

The implementation of a method according to the invention in the form of a computer program or computer program product having program code for carrying out all method steps is also advantageous, since this causes particularly low costs, in particular if an executing control unit is also used for further tasks and is therefore provided in any case. Suitable data carriers for providing the computer program are in particular magnetic, optical, and electrical memories, e.g., hard drives, flash memories, EEPROMs, DVDs etc. A download of a program via computer networks (Internet, Intranet, etc.) is also possible.

BRIEF DESCRIPTION OF THE DRAWINGS

Further advantages and embodiments of the invention result from the description and the appended drawing.

The invention is schematically illustrated on the basis of exemplary embodiments in the drawing and is described hereinafter with reference to the drawing.

DETAILED DESCRIPTION

Figure 1:
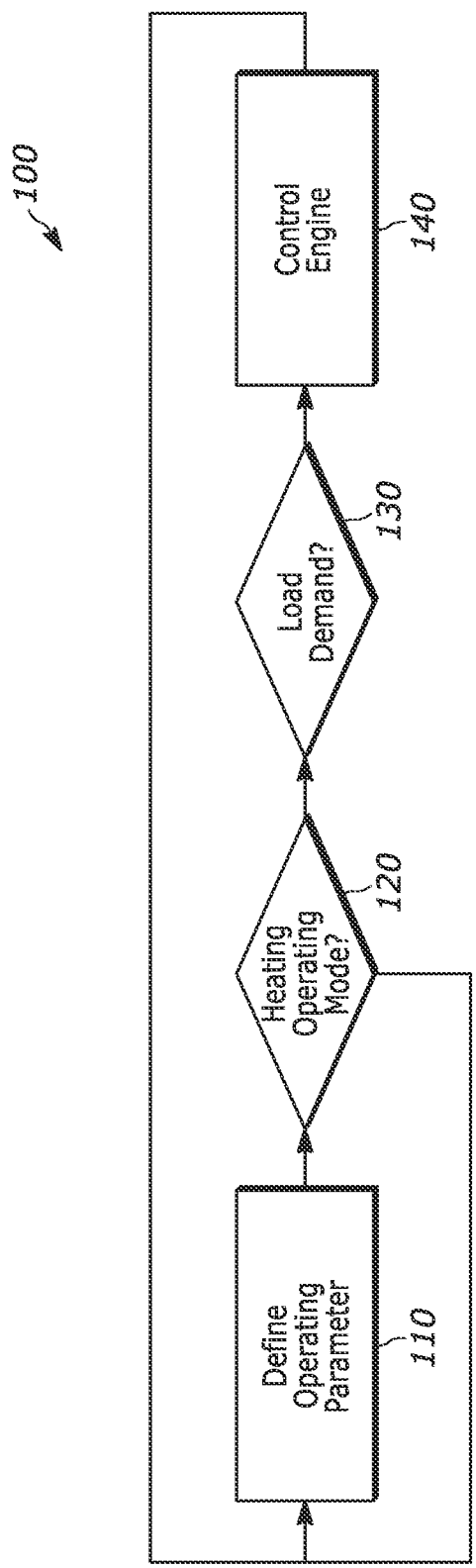
FIG. 1 shows an advantageous embodiment of a method according to the invention in the form of a greatly simplified flow chart.
Figure 2:
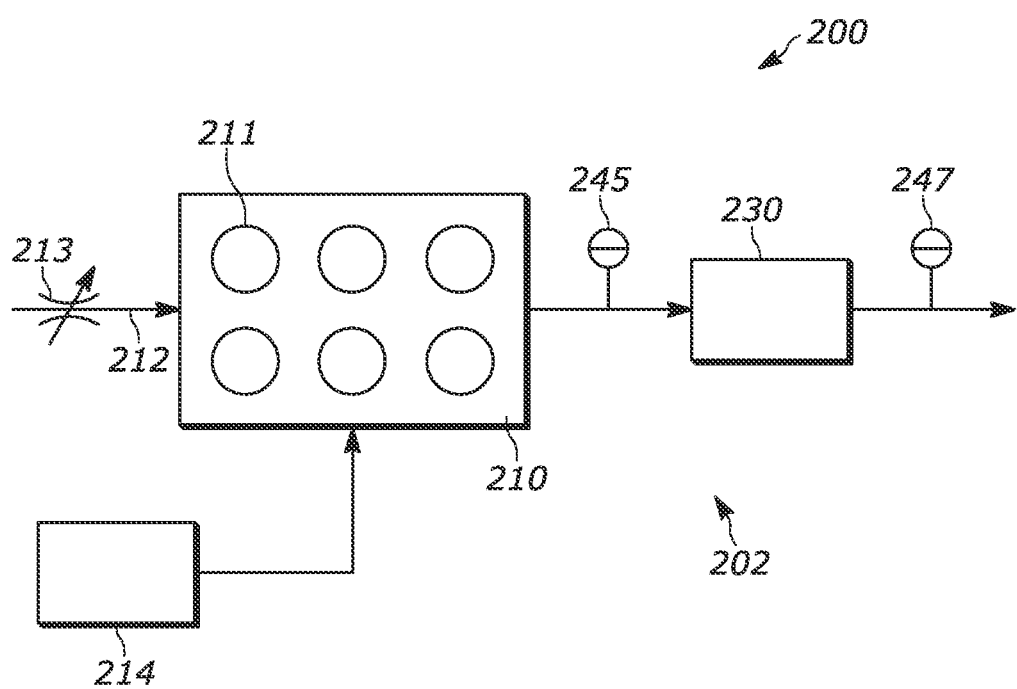
FIG. 2 schematically shows an arrangement of an internal combustion engine having a throttle valve and an exhaust gas posttreatment system, as can be used in the scope of the invention.

An advantageous embodiment of a method according to the invention is shown in the form of a greatly simplified flow chart in FIG. 1 and identified as a whole with 100. The method 100 is used to control a lean-burn engine having compression-ignition (for example, diesel engine) in selected operating states and is explained hereinafter with reference to FIG. 2, in which an arrangement of an internal combustion engine having a throttle valve and an exhaust gas posttreatment system, as can be used in the scope of the invention, is schematically shown and identified as a whole with 200.

The arrangement 200 has a supply device 214 for introducing fuel into a combustion chamber or cylinder 211 of an internal combustion engine 210. A throttle valve 213 is situated in an air path 212, via which combustion air is guided into the respective combustion chamber 211. The amount of air can be controlled via the opening angle of the throttle valve 213. Exhaust gas produced in the internal combustion engine 210 is exhausted via an exhaust gas posttreatment system 202, which, in the example shown, comprises a catalytic converter 230 for converting pollutants contained in the exhaust gas into less harmful compounds. Furthermore, the exhaust gas posttreatment system 202 comprises exhaust gas sensors 245, 247 upstream and downstream of the catalytic converter 230, for example, lambda sensors, which can be used to control or monitor a composition of the exhaust gas of the internal combustion engine 210.

The exhaust gas posttreatment system 202 can also contain further components, for example, further catalytic converters, particle filters, or the like.

In a first step 110 of the method 100, at least one operating parameter of an internal combustion engine 210 or a component of its exhaust gas posttreatment system 202 is ascertained. In particular, the at least one operating parameter can be a temperature of a component of the exhaust gas posttreatment system 202, for example, of the catalytic converter 230, or the internal combustion engine 210 (for example, coolant water temperature), a speed (crankshaft speed) of the internal combustion engine 210, a fill level of an accumulator for exhaust gas components (catalytic converter), or the like. The ascertainment of the at least one operating parameter can be carried out here using a measuring instrument, for example, a lambda sensor 245, 247 and/or by calculation on the basis of a mathematical model. In particular fill levels of storage catalytic converters can be ascertained in a model-based manner, for example, as described in DE 10 2016 222 418 A1 (in particular for gasoline engine catalytic converters).

On the basis of the at least one operating parameter, it is determined in a second step 120 of the method 100 whether a heating operating mode or a normal operating mode is to be carried out. If the heating operating mode is selected here, which will be the case in particular if the operating parameter indicates a need for heating, for example, if an ascertained temperature is less than a threshold value or an ascertained fill level of a nitrogen accumulator of the catalytic converter 230 exceeds a predetermined threshold value, the method continues with a step 130, in which a present torque demand is ascertained. The torque demand can be ascertained here in particular by evaluating an accelerator pedal position, a presently used transmission ratio, or other relevant influencing variables.

In dependence on the ascertained torque demand, in a control step 140, the internal combustion engine 210 is controlled in the heating operating mode to produce a rich exhaust gas and for the most suitable possible torque generation. For this purpose, the throttle valve 213 in the air path 212 upstream of the internal combustion engine 210 is partially closed. The degree to which the throttle valve 213 is closed can be selected here in consideration of the at least one operating parameter and/or further influencing variables so that a stable combustion is ensured in the internal combustion engine 210 and, for example, vibrations are also minimized or acoustic emissions due to the throttled operation do not exceed a specifiable threshold value.

If it has been ascertained in step 130 that there is no torque demand, in the heating operating mode, fuel is nonetheless metered into the internal combustion engine 210 and combusted with the minimal amount of air to avoid cooling of components of the exhaust gas posttreatment system 202 arranged downstream of the internal combustion engine 210 or to achieve heating of these components. The fuel metering can be set here in particular according to a desired lambda value (for example, close to 1 for minimal emissions or less than 1 for increased heating power).

As already explained at the outset, the excess torque hereby generated can be used, for example, for current generation. For this purpose, for example, a generator (dynamo) installed in any case, a starter generator, or an electrical machine, which is provided as an electrical drive motor, can be operated as a generator and the current thus generated can be used, for example, to charge a vehicle battery. On the one hand, the generated torque is thus dissipated, on the other hand, the energy is reasonably used, due to which the overall efficiency of an assembly thus operated, for example a motor vehicle, is increased.

In contrast, if it is ascertained in step 120 that there is no heating demand and therefore the normal operating mode is selected, if a torque demand is absent, the internal combustion engine 210 can be moved into an overrun shutoff operation, in which no fuel is metered. The throttle valve 213, which is usually partially closed for the heating operating mode, is typically completely opened in the normal operating mode. Since this control corresponds to a conventional procedure, it will not be described in more detail here. In the scope of the invention, it can therefore be presumed that the method 100 returns to step 110 until the heating operating mode is required.

The invention claimed is:

1. A method (100) for operating an internal combustion engine (210), which comprises a lean-burn engine, having a throttle valve (213) in an air path (212) upstream of the internal combustion engine (210) and an exhaust gas posttreatment system (202) downstream of the internal combustion engine (210), the method comprising:
   controlling the internal combustion engine (210) according to a present load demand (130) using metering of an amount of fuel in dependence on the present load demand; and
   when a load demand (130) is absent in a heating operating mode, partially closing (140) the throttle valve (213) and defining a minimum value for the amount of fuel, which is greater than zero, wherein the heating operating mode comprises absorbing provided torque by way of an electrical machine and using the absorbed torque to generate electrical energy.

2. The method (100) according to claim 1, in which the heating operating mode comprises controlling (140) the internal combustion engine (210) to produce an exhaust gas having an air-fuel ratio less than or equal to 1.

3. The method according to claim 1, wherein the minimum value for the amount of fuel is defined in dependence (120) on a temperature (110) of the exhaust gas posttreatment system (202) and/or in dependence (120) on a function of the exhaust gas posttreatment system (202).

4. The method (100) according to claim 3, wherein the function of the exhaust gas posttreatment system (202) comprises a regeneration of a particle filter and/or a reduction of an exhaust gas component stored in a storage catalytic converter (230).

5. The method (100) according to claim 1, wherein the partial closing (140) of the throttle valve (213) takes place in dependence on a minimum required amount of air.

6. The method (100) according to claim 5, comprising ascertaining (110) the minimum required amount of air in dependence on at least one selected from the group consisting of a stability of the combustion of fuel in the internal combustion engine (210), an acoustic threshold value, and a vibration threshold value.

7. The method (100) according to claim 1, wherein the electrical machine is used in a normal operating mode to provide torque according to the load demand and/or to generate electrical energy for use in a power grid.

8. A non-transitory, computer-readable storage medium containing instructions that when executed by a computer cause the computer to
   control an internal combustion engine (210) according to a present load demand (130) using metering of an amount of fuel in dependence on the present load demand; and
   when a load demand (130) is absent in a heating operating mode, partially closing (140) a throttle valve (213) and defining a minimum value for the amount of fuel, which is greater than zero, wherein the heating operating mode comprises absorbing provided torque by way of an electrical machine and using the absorbed torque to generate electrical energy.

* * * * *